United States Patent [19]
Nappi

[11] Patent Number: 6,059,864
[45] Date of Patent: May 9, 2000

[54] APPARATUS FOR CLEANING FILTERED PARTICLES FROM AN AIR FILTER USING INTERNAL POROUS TUBULAR MEMBERS

[76] Inventor: Jason Scott Nappi, 2002 High St., Leesburg, Fla. 34748

[21] Appl. No.: 09/179,350

[22] Filed: Oct. 7, 1998

[51] Int. Cl.$^7$ .................................................. B01D 29/68
[52] U.S. Cl. ................................ 96/233; 55/288; 55/301; 55/511
[58] Field of Search ............................ 55/282, 288, 301, 55/302, 511, DIG. 31; 96/228, 229, 232, 233; 95/278, 279, 281

[56] References Cited

U.S. PATENT DOCUMENTS

| | | | |
|---|---|---|---|
| 3,563,474 | 2/1971 | Robinson | 96/233 |
| 3,958,296 | 5/1976 | Fell | 55/302 |
| 4,120,671 | 10/1978 | Steinmeyer | 95/281 |

FOREIGN PATENT DOCUMENTS

| | | | |
|---|---|---|---|
| 2199769 | 7/1988 | United Kingdom | 55/302 |

*Primary Examiner*—David A. Simmons
*Assistant Examiner*—Robert A. Hopkins

[57] ABSTRACT

An air filter used for the filtration of air for a central air and heating system with an internal cleaning apparatus fabricated for easy cleaning of particles from the air filter. This internal cleaning apparatus comprising a cylindrical member with protruding jets adjacent to each other around the mid perimeter of the cylindrical member. The jets receive the porous tubular members which are caped to abstain water form going out the ends. The cylindrical member has a circular posterior member which is affixed to the cylindrical member and is parallel to the circular face member which is unfixed to the cylindrical member. The circular face member has a centrally located female hose fitting protruding downward into the cylindrical member adjacent to the circular posterior member. The female hose fitting receives a male hose fitting, whereby allowing water to flow through the cylindrical member and out the porous tubular members. The porous tubular members are adjacent to the filter material thus cleaning particles from the air filter.

5 Claims, 6 Drawing Sheets

APPARATUS FOR CLEANING FILTERED PARTICLES FROM AN AIR FILTER USING INTERNAL POROUS TUBULAR MEMBERS

BACKGROUND OF THE INVENTION

In many respects, the central air and heating system is one of the best means of cooling and heating a dwelling. The maintenance on the system is also very important to avoid problems and keep the system energy efficient. The air filter placed in the system is one resourceful way to avoid problems. The air filter entraps particles in the air filter before entering the system thus keeping the system and the air clean. Air filters must be periodically changed or cleaned to avoid clogging the air filter which will restrict air from passing through the air filter.

Various prior art engagements for filtration are resourceful for filtration but prior art proposals lack an easy method for an individual to remove particles from an air filter for the filtration of air for a central air and heating system.

The Uchiyama U.S. Pat. No. 4,992,167 entitled "Filtering Apparatus" relates to a filtering apparatus for filtering cutting oil containing metal chips so that the filtered cutting oil can be recycled. The Uchiyama filtering apparatus is resourceful for the filtering of cutting oil but is incapable of filtering air particles from air.

The Clifford U.S. Pat. No. 4,952,325 entitled "Apparatus and Method For Cleaning Filtered Accumalation From An Annular Filter" relates to cylindrical textile filters utilized in textile wet processing systems. This filtration system does not pertain to the filtration of air particles in a central air and heating system.

The Muller U.S. Pat. No. 4,167,482 entitled "Filtering Method And Apparatus" relates to the filtering of liquid or gas which a housing and brush like filter element is used in the filtering of its material.

The Barry U.S. Pat. No. 5,114,574 entitled "Backflush Filter System With Insert Member Diffusing Filtering And Backflush Flow" relates to the filtration of liquid with air vents to have an air free liquid flow system.

The Thomas P. U.S. Pat. No. 4,626,347 entitled "Self-Cleaning Filter Adapted For Rapid, Inexpensive Installation" relates to the filtration of liquids with floating filters mainly used for the filtration of oil in a fuel tank.

The Seever U.S. Pat. No. 4,217,116 entitled "Method And Apparatus For The Cleaning Of The Surface Of Filter Panels In A Fluid Passageway" relates to the filtration of air with an air filter. The air filter or panel is cleaned by fluid when selectively moved into a passageway of fluid. This design involves cleaning the filter externally and relatively expensive components to defeat this purpose.

The Miropolsky U.S. Pat. No. 4,162,219 entitled "Self Cleaning Filter" relates to the purification of liquid and resourceful in the self cleaning purification of liquid but cannot purify air particles from air.

The Lambert U.S. Pat. No. 4,108,778 entitled "Self Cleaning Filter And Vortexer" relates to the filtration of liquid and is resourceful in the filtering of liquid but cannot filter air particles from air.

The Krecklauer U.S. Pat. No. 3,655,049 entitled "Method And Apparatus For Retaining And Dislodging Filter Cake" relates to the removal of filter cake from filter plates. The filter cake is removed by oscillating the filter through water and externally removing filter cake form filter.

The Benson U.S. Pat. No. 5,286,376 entitled "Filtering Apparatus" relates to the filtration of liquid and is resourceful in the filtration of liquid but cannot filter air particles from air.

The Turner U.S. Pat. No. 5,342,514 entitled "Electrical Filter" relates to the filtration of liquid using cathode modules and electrically conducting sheets of filter medium. This filter is resourceful for the filtration of liquids but cannot filter air particles from air.

The Drori U.S. Pat. No. 5,112,481 entitled "Filter System Having Multiple Filter Elements And Backflowing Assemblies" relates to the filtering of liquid and is resourceful in the filtration of liquid but cannot filter air particles from air.

As will be seen hereinafter, none of these prior art arrangements are at all similar to the capabilities of this invention.

SUMMARY OF THE INVENTION

An internal cleaning apparatus within an air filter in accordance with this invention comprises a cylindrical member with protruding jets adjacent to each other around the mid perimeter of the cylindrical member. The jets receive the porous tubular members which are caped to abstain water from going out the ends. The cylindrical member also has a circular posterior member which is affixed to the cylindrical member and parallel to the circular face member which is unfixed to the cylinder. The circular face member has a centrally located female hose fitting protruding downward into the cylindrical member adjacent to the circular posterior member. The female hose fitting receives a male hose fitting, whereby, allowing water to flow through the cylindrical member and out the porous tubular members. The porous tubular members are adjacent to the filter material thus cleaning particles from the air filter.

A further object of the present invention is an easy and efficient way for an individual to clean their air filter. The internal cleaning apparatus is easily connected to a male hose fitting by taking the end of the male hose fitting in one hand and turning the entire air filter counter clockwise to tighten the fittings. The water is engaged by turning the faucet to its on position thus in a small amount of time particles are removed from the air filter.

A still further object of the present invention is that the internal cleaning apparatus is cleaning the air filter from internally to externally rather than externally to internally to avoid the collection of particles in the internal part of the air filter thus contradicting the purpose of an air filter fabricated to adequately filter air.

The purpose of this invention is for an individual to easily clean their air filter and after the cleaning process have an air filter which collects the same amount of particles as its first time use.

DETAILED DESCRIPTION

Figure 1A:
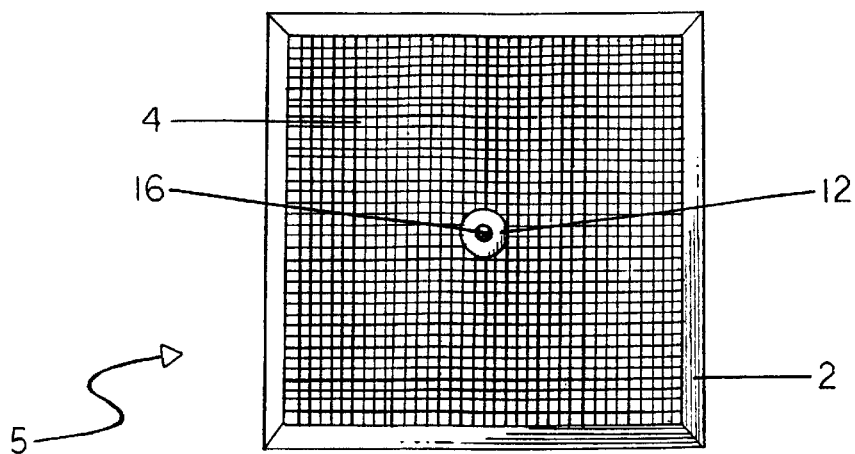
FIG. 1A is a frontal view of the exterior of the air filter revealing the female hose fitting centrally located in the circular face member surrounded by the face filter mesh and the frame.

As viewed in FIG. 1A, it will be seen that I have shown the exterior front side of the assembled air filter 5. The air filter 5 also reveals the female hose fitting 16 centrally located in the circular face member 12 surrounded by the face filter mesh 4 and the frame 2 of the air filter 5.

With continued reference to FIG. 1A, the air filter 5 will be placed opposite to the air flow being filtered to avoid particles in the air from clogging the female hose fitting 16 during normal use of this air filter 5.

Figure 1B:
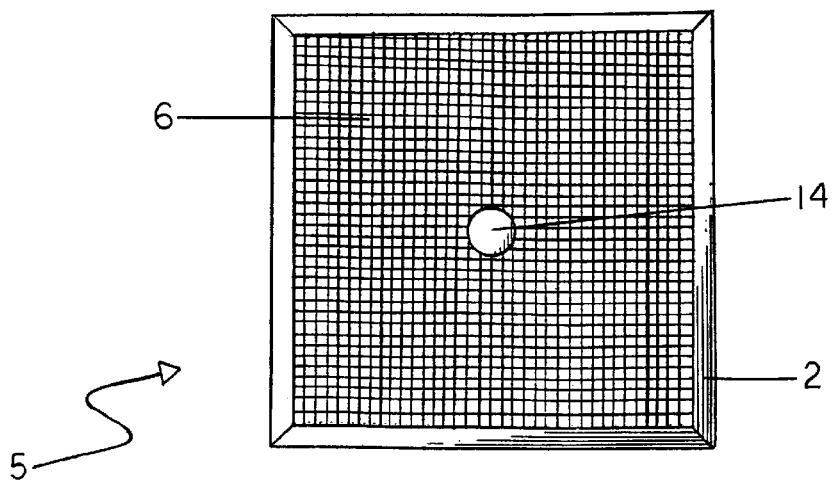
FIG. 1B is a view of the backside of the air filter revealing the circular posterior member surrounded by the posterior filter mesh and the frame.

Referring now to FIG. 1B, it will be seen that I have shown the exterior back side of the assembled air filter 5. The air filter 5 also reveals the circular posterior member 14 surrounded by the posterior filter mesh 6 and the frame 2 of the air filter 5.

With continued reference to FIG. 1B, the air filter 5 will be placed in the air flow allowing air flow to propel accordingly across the circular posterior member 14 and into the posterior filter mesh 6.

Figure 2A:
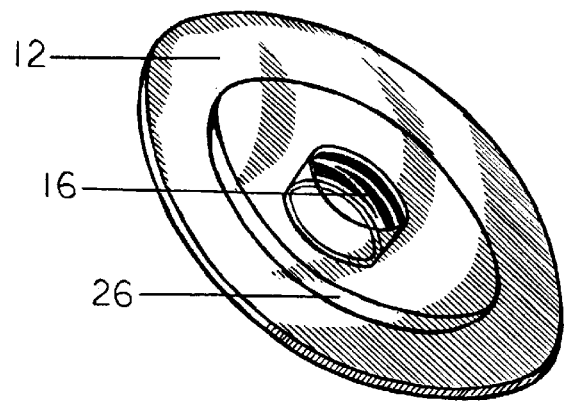
FIG. 2A is a perspective view showing the circular face member with the centrally located female hose fitting, including the circular face members posterior lip.

Referring now to FIG. 2A, it will be seen that I have shown the perspective view of the circular face member 12 with the centrally located female hose fitting 16 including the circular face members posterior lip 26. The circular face members posterior lip 26 is present for the easy assembly of the air filter 5 shown in FIGS. 1A and 1B during manufacturing. The circular face members posterior lip 26 is unfixed to the cylindrical member 18 shown in FIG. 2B before assembly and permanently affixed to the cylindrical member 18 as the last step of assembly.

Figure 2B:
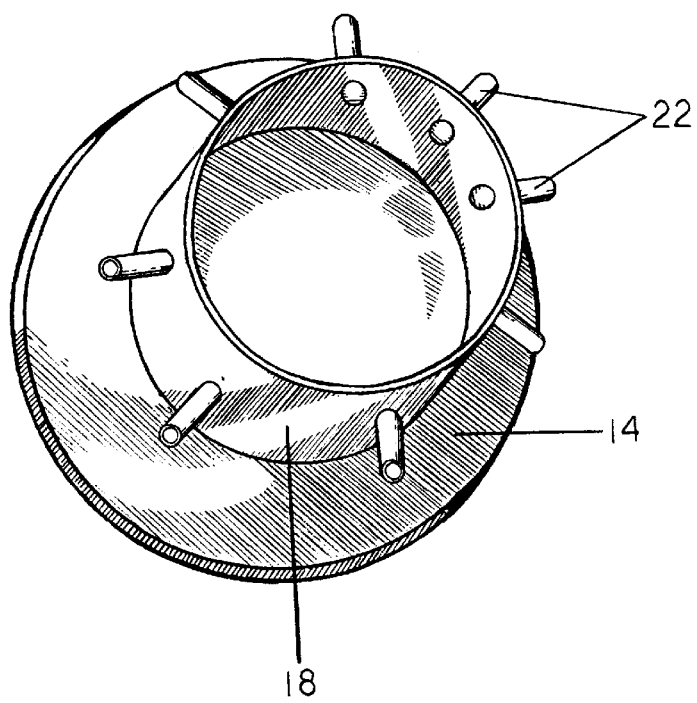
FIG. 2B is a perspective view showing the cylindrical member affixed to the circular posterior member, including the protruding jets that are adjacent to each other around the perimeter of the cylindrical member.

Referring now to FIG. 2B, it will be seen that I have shown the cylindrical member 18 affixed to the circular posterior member 14 including the protruding jets 22 that are adjacent to each other around the mid perimeter of the cylindrical member 18. The apex of the cylindrical member 18 receives the circular face members posterior lip 26 shown in FIG. 2A and once permanently affixed to the cylindrical member 18 the female hose fitting 16 will be adjacent to the circular posterior member 14 and the circular face member 12 shown in FIG. 2A will be parallel to the circular posterior member 14.

Figure 3:
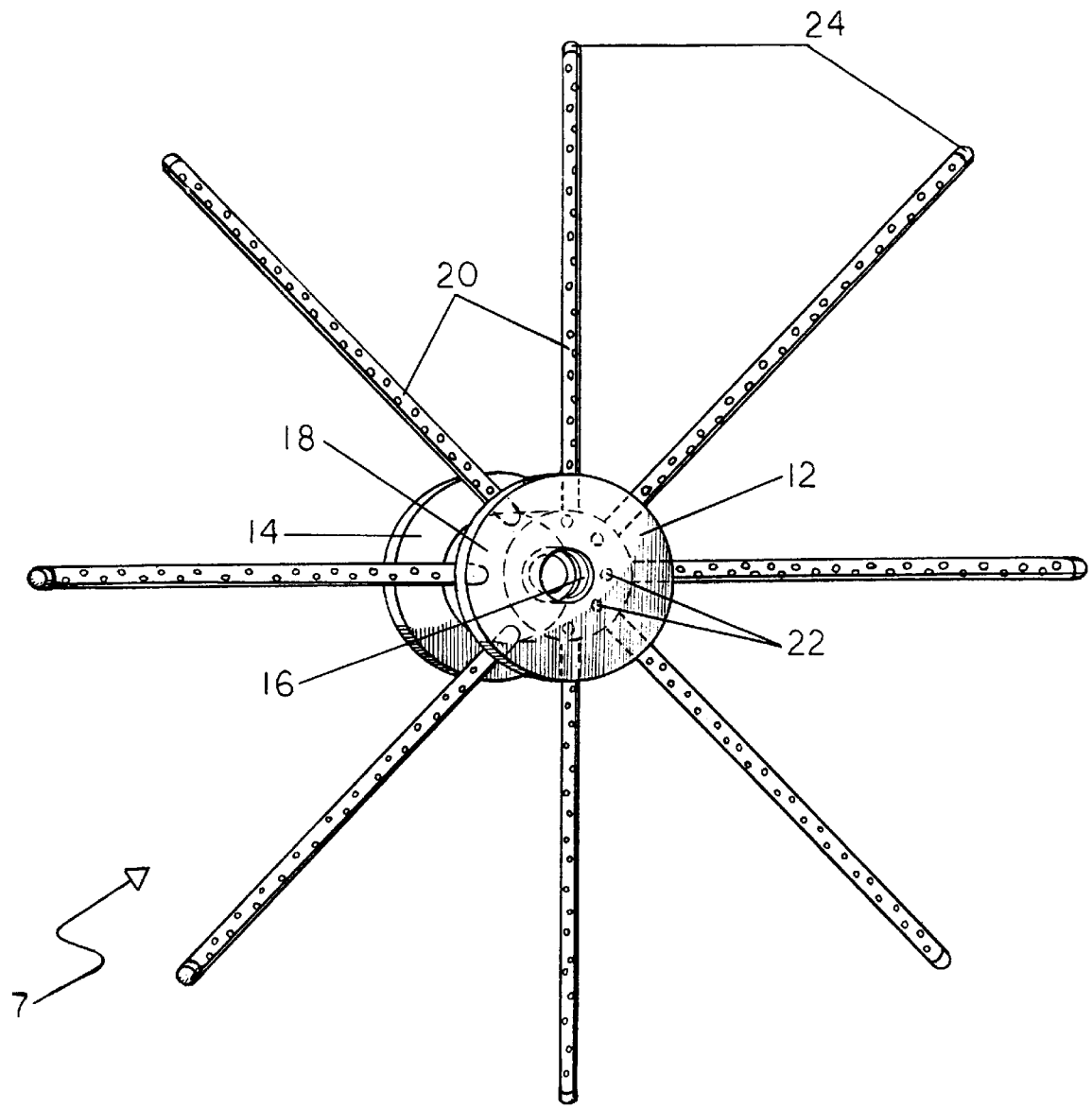
FIG. 3 is a perspective view showing the assembled internal cleaning apparatus revealing the cylindrical member attached to the tubular members by the adjacent jets around the mid perimeter of the cylindrical member.

Referring now to FIG. 3, it will be seen that I have shown the perspective view of the assembled internal cleaning apparatus 7. The cylindrical member 18 has the parallel circular face member 12 and the circular posterior member 14 permanently affixed to either end of the cylindrical member 18 thus forming a sealed chamber. The circular face member 12 has a centrally located female hose fitting 16 protruding downward into the cylindrical member 18 and is adjacent to the circular posterior member 14. The cylindrical member 18 has adjacent jets 22 around the mid perimeter of the cylindrical member 18 which receives the porous tubular members 20. The porous tubular members 20 have end caps 24 permanently affixed to the porous tubular members 20.

With continued reference to FIG. 3, the internal cleaning apparatus 7 is in operation when water flows through the female hose fitting 16 into the cylindrical member 18 through the jets 22 and out the porous tubular members 20.

Figure 4:
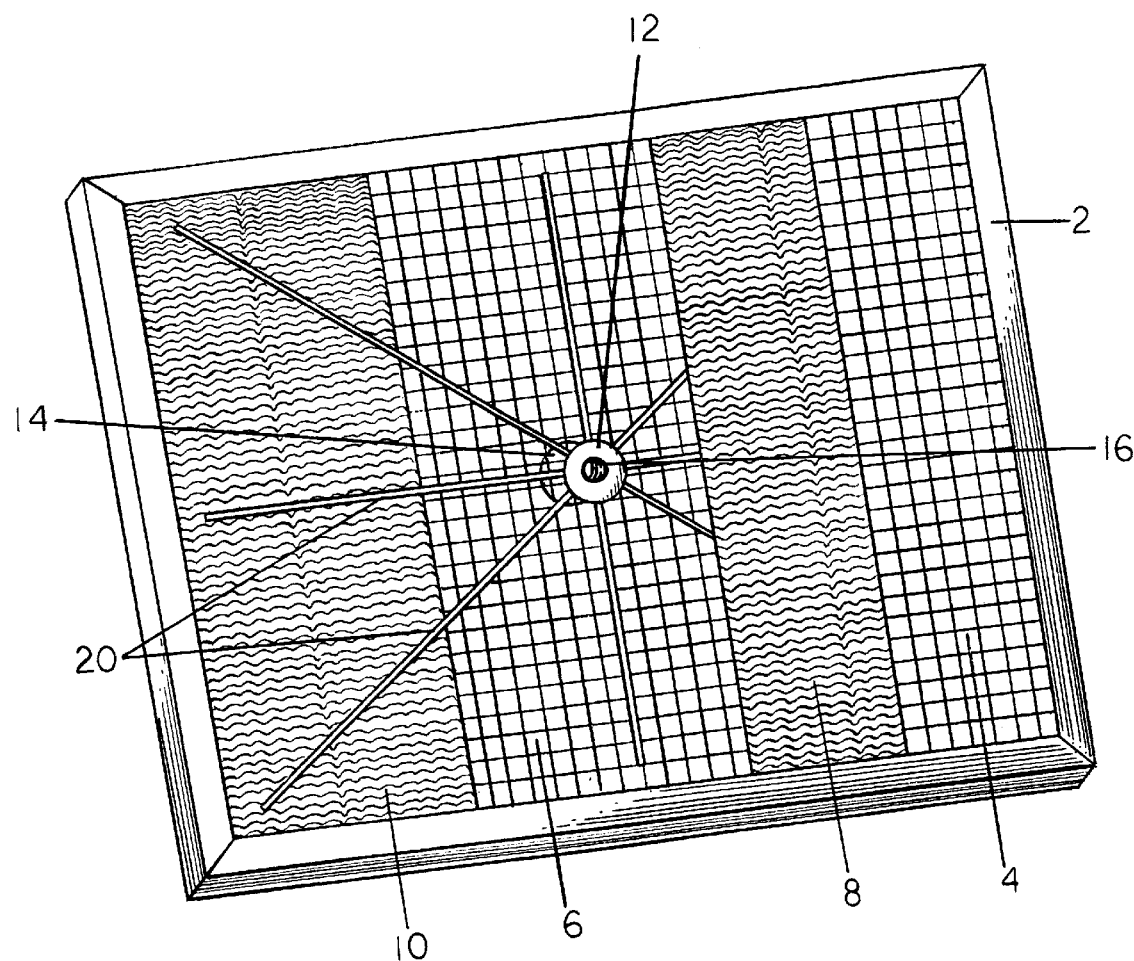
FIG. 4 is a perspective frontal view showing the internal cleaning apparatus in accordance to the air filter, this view gives a layered effect in which the face filter material and mesh continues to the left vertical side of the frame and also not shown is the posterior filter material and mesh continues to the right vertical side of the frame.

Referring now to FIG. 4, it will be seen that I have shown the perspective frontal view showing the internal cleaning apparatus in accordance to the air filter. The face filter material 8 and the face filter mesh 4 do continue to the left vertical side of the frame 2 and also have a circular portion cut from them to fit closely under the circular face member 12 with the female hose fitting 16. The posterior filter material 10 and posterior filter mesh 6 do continue to the right vertical side of the frame 2 and also have a circular portion cut from them to fit closely under the circular posterior member 14. The porous tubular members 20 reside between the face filter material 8 and posterior filter material 10.

With continued reference to FIG. 4, when the internal cleaning apparatus in accordance to the air filter is in operation the water flows into the female hose fitting 16 and out the porous tubular members 20 thus cleaning particles from the face filter material 8 and posterior filter material 10.

With continued reference to FIG. 4, the face filter mesh 4 and posterior filter mesh 6 is able to support the internal cleaning apparatus face filter material 8, and posterior filter material 10.

Figure 5:
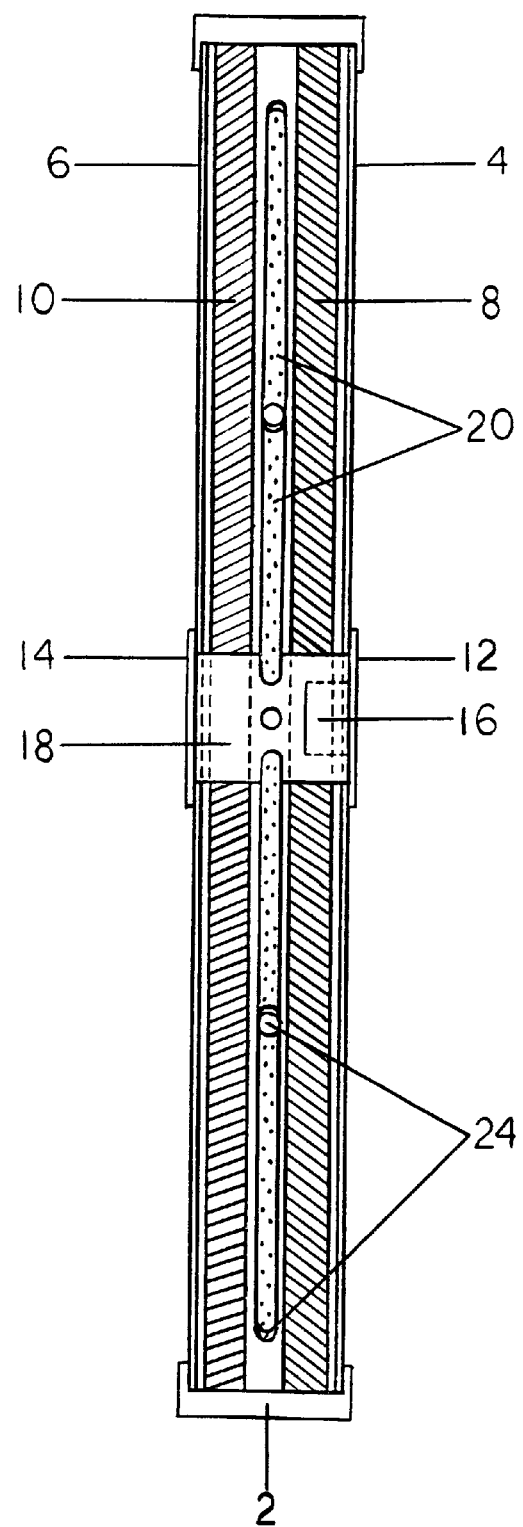
FIG. 5 is a side view showing the spaced relationship between the internal cleaning apparatus and the parts of the air filter.

Referring now to FIG. 5, it will be seen that I have shown the side view to show the spaced relationship between the internal cleaning apparatus and the parts of the air filter. The posterior filter mesh 6 and the face filter mesh 4 are externally adjacent to the posterior filter material 10 and face filter material 8 and retained by the frame 2. The adjacent porous tubular members 20 which have end caps 24 are affixed to the cylindrical member 18. The cylindrical member 18 has a circular posterior member 14 and circular face member 12 and are affixed to either end of the cylindrical member 18. The circular face member 12 has the female hose fitting 16 which protrudes downward into the cylindrical member 18 and is adjacent to the circular posterior member 14.

Figure 6:
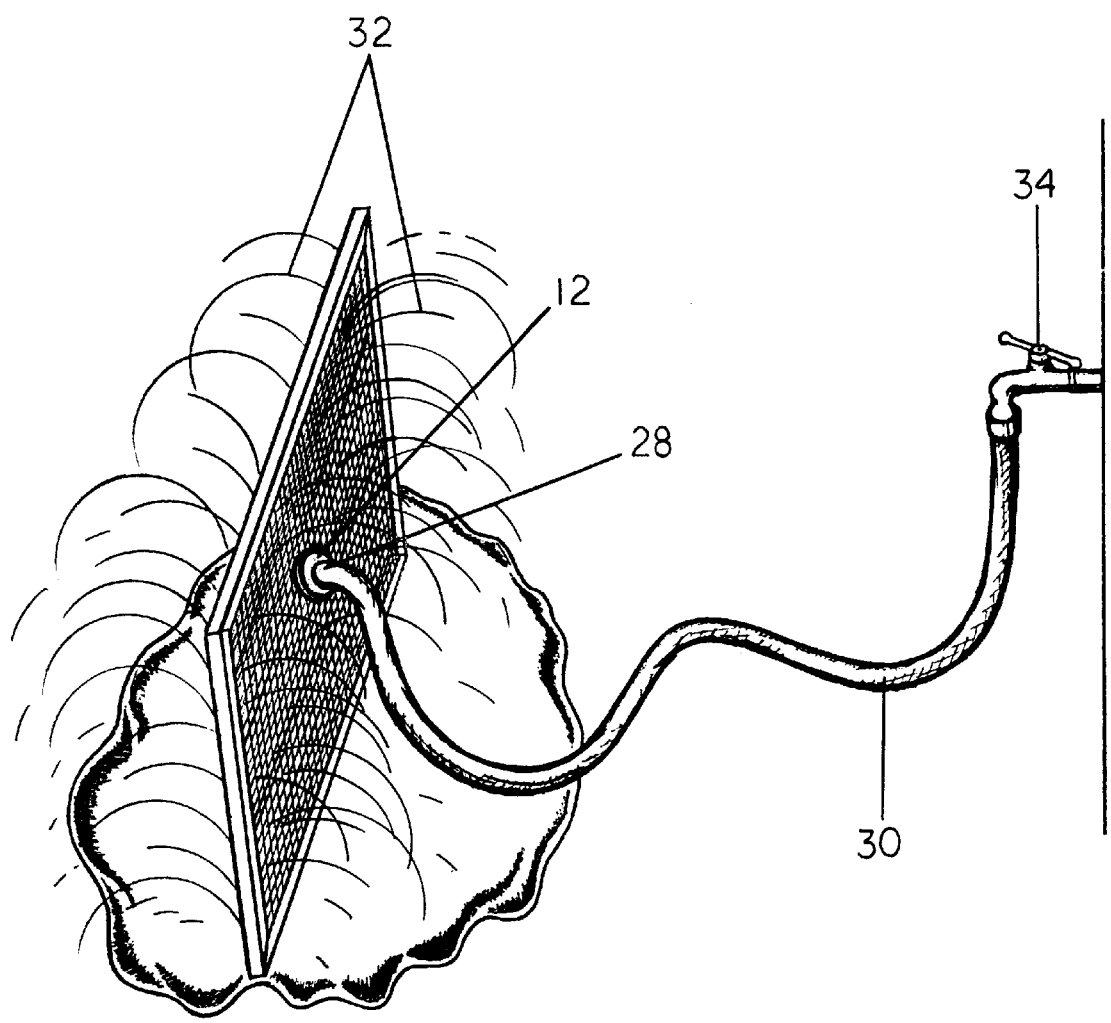
FIG. 6 is a perspective view showing the apparatus in operation by illustrating how the male hose fitting is connected into the internal cleaning apparatus thus sending water throughout the internal cleaning apparatus which cleans the air filter.

Referring now to FIG. 6, it will be seen that I have shown the perspective frontal view of the internal cleaning apparatus in operation. The water 32 from the faucet 34 is introduced to the internal cleaning apparatus as shown in FIG. 3 by connecting the male hose fitting 28 from the hose 30 into the female hose fitting 16 of the circular face member 12 thus cleaning particles from air filter as shown in FIG. 4.

It is thus to be seen that provided in accordance with this invention is an apparatus and easy method from cleaning filtered particles from an air filter.

I claim:

1. An air filter having filter material, a filter mesh externally adjacent to the filter material, and a frame surrounding the filter material and filter mesh, an internal cleaning apparatus, said internal cleaning apparatus is fabricated for easy cleaning of particles from said air filter, said internal cleaning apparatus comprises a cylindrical member with protruding jets around the mid perimeter of said cylindrical member, said jets receive porous tubular members having ends, said cylindrical member has a circular posterior member which is affixed to said cylindrical member, said circular posterior member is parallel to a circular face member which is removably connected to said cylindrical member, said circular face member has a centrally located female hose fitting protruding downward into said cylindrical member adjacent to said circular posterior member, said female hose fitting receives a male hose fitting allowing water to flow through said cylindrical member and out said porous tubular members, said porous tubular members are adjacent to the filter material thus cleaning particles from said air filter.

2. An air filter used for the filtration of air with an internal cleaning apparatus as recited in claim 1 in which said porous tubular members are constructed and designed to avoid obstruction of air flow through said air filter.

3. An air filter used for the filtration of air with an internal cleaning apparatus as recited in claim 1 in which said circular face member which is removably connected to the said cylindrical member includes a posterior lip fixed to said circular face member, wherein said posterior lip is permanently affixed to said cylindrical member during assembly of said air filter to avoid difficult conjunction of parts in said air filter.

4. An air filter used for the filtration of air with an internal cleaning apparatus as recited in claim 1 in which said female hose fitting is placed opposite air flow during normal use of said air filter filtering particles from air to avoid clogging of said female hose fitting.

5. An air filter having a face filter material, posterior filter material, an externally adjacent filter mesh, and a surrounding frame, said air filter is used for the filtration of air for central air and heating systems with an internal cleaning apparatus fabricated for easy cleaning of particles from said air filter, said internal cleaning apparatus has tubular members which are adjacent to the face filter material and posterior filter material, said face filter material and said posterior filter material are internally adjacent to face filter mesh and posterior filter mesh, said face filter material and said face filter mesh have a circular portion cut from them to fit closely under a circular face member, said posterior filter material and said posterior filter mesh have a circular portion cut from them to fit closely under a circular posterior member, said face filter mesh and said posterior filter mesh are surrounded by a frame of said air filter and is the main support of said internal cleaning apparatus.

\* \* \* \* \*